UNITED STATES PATENT OFFICE.

MARTIN E. WALDSTEIN, OF NEW YORK, N. Y.

PROCESS OF EXTRACTING GOLD OR SILVER FROM ORES.

SPECIFICATION forming part of Letters Patent No. 543,543, dated July 30, 1895.

Application filed September 1, 1894. Serial No. 521,972. (No specimens.)

*To all whom it may concern:*

Be it known that I, MARTIN E. WALDSTEIN, of the city, county, and State of New York, have invented a new and useful Process of Extracting Gold or Silver from Ores, of which the following is a specification.

The object of my invention is to extract precious metals (gold and silver) from ores containing these bodies, and my process is carried out substantially as follows: I have found that in the cyanide process of the extraction of precious metals from the ores containing them, the presence of oxygen in its nascent state increases the dissolving-action of the cyanide materially. This oxygen may be procured in various ways—as, for instance, by the addition to the ore and cyanide of potassium of binoxide of barium, peroxide of lead, the chlorates, bromates, or iodates of the alkalies or alkaline earths in connection with an acid, or by the addition of peroxide of hydrogen.

The following is an illustration of one way in which my process can be carried out: To every ton of ore I take three pounds, more or less, of cyanide of potassium, one and one-half pounds, more or less, binoxide of barium, and an equivalent quantity of an acid, such as sulphuric acid, to decompose only the binoxide of barium and water. By agitating in a suitable manner the ore with these chemicals I find that most of the precious metals contained in the ore are extracted, and are contained in solution in the form of double cyanide of potash of silver or gold. To extract the precious metals from this liquid I may add an excess of mineral acid—as, for instance, sulphuric acid—to decompose the double cyanide and drive off hydrocyanic acid, as shown by the following formula:

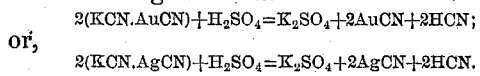

$$2(KCN.AuCN)+H_2SO_4=K_2SO_4+2AuCN+2HCN;$$
or,
$$2(KCN.AgCN)+H_2SO_4=K_2SO_4+2AgCN+2HCN.$$

I then precipitate the gold or silver from the resulting solution by means of sulphureted hydrogen or by a soluble sulphide. This causes an insoluble precipitate of sulphide of silver or gold, which can readily be separated from the liquid by filtration or other convenient method.

It is understood, of course, that the ore is first put through the usual crushing process.

In using the term "sulphureted hydrogen," I wish to include not only what is ordinarily known by that name, but all known equivalents thereof.

What I claim as my invention, and desire to secure by Letters Patent, is—

1. The process of extracting precious metals from ores, consisting in subjecting the ores to the action of cyanide of potassium, adding to the materials during this action, a salt or salts decomposable by an acid and yielding oxygen, and sufficient acid to decompose this salt, or salts and subsequently adding an excess of acid, to decompose the double cyanide and finally separating the precious metal from its compound in any suitable manner, substantially as specified.

2. The decomposition by means of a mineral acid of the double cyanides of silver or gold formed by the cyanide process, and the precipitation of silver or gold as sulphides by means of sulphureted hydrogen.

In testimony whereof I have signed my name to this specification in the presence of two subscribing witnesses.

MARTIN E. WALDSTEIN.

Witnesses:
ANTHONY GREF,
W. LAIRD GOLDSBOROUGH.